US012568090B2

(12) United States Patent
Carru et al.

(10) Patent No.: US 12,568,090 B2
(45) Date of Patent: Mar. 3, 2026

(54) SYSTEMS AND METHODS FOR MANAGING DATABASE-LEVEL ROLES FOR DATA SHARING

(71) Applicant: Snowflake Inc., Bozeman, MT (US)

(72) Inventors: Damien Carru, Rhinebeck, NY (US); Jeremy Yujui Chen, Newark, CA (US); Laxman Mamidi, Redwood City, CA (US); Bowen Zhang, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/160,801

(22) Filed: Jan. 27, 2023

(65) Prior Publication Data

US 2024/0259387 A1 Aug. 1, 2024

(51) Int. Cl.
G06F 21/62 (2013.01)
H04L 9/40 (2022.01)
(52) U.S. Cl.
CPC ........ H04L 63/105 (2013.01); G06F 21/6218 (2013.01)
(58) Field of Classification Search
CPC ............................ H04L 63/105; G06F 21/6218
(Continued)

(56) References Cited

U.S. PATENT DOCUMENTS

| | | | | | |
|---|---|---|---|---|---|
| 5,946,399 | A | * | 8/1999 | Kitaj | ....................... G06F 21/85 |
| | | | | | 719/321 |
| 6,993,657 | B1 | * | 1/2006 | Renner | ............... G06F 21/6227 |
| | | | | | 726/19 |

(Continued)

FOREIGN PATENT DOCUMENTS

| | | | | | |
|---|---|---|---|---|---|
| CN | 109525570 | A | * | 3/2019 | ......... H04L 63/0428 |
| CN | 110348202 | A | * | 10/2019 | |

(Continued)

OTHER PUBLICATIONS

Li, Wei, Haishan Wan, Xunyi Ren, and Sheng Li. "A refined RBAC model for cloud computing." In 2012 IEEE/ACIS 11th International Conference on Computer and Information Science, pp. 43-48. IEEE, 2012. (Year: 2012).*

(Continued)

*Primary Examiner* — Luu T Pham
*Assistant Examiner* — Walter J Malinowski
(74) *Attorney, Agent, or Firm* — Schwegman Lundberg & Woessner, P.A.

(57) ABSTRACT

Disclosed herein are systems and methods for managing database-level roles for data sharing. In an embodiment, a database system shares a database that resides in a data-provider account with a data-consumer account. The provider-side database includes a provider-side database-level role. The database system receives a request to grant the provider-side database-level role to a consumer-side account-level role in the data-consumer account. The database system responsively grants a hidden provider-side database-level role in the data-provider account to a hidden consumer-side database-level role in the data-consumer account, where the hidden provider-side database-level role had been granted to the provider-side database-level role, and grants the hidden consumer-side database-level role to the consumer-side account-level role in the data-consumer account.

25 Claims, 9 Drawing Sheets

(58) Field of Classification Search
USPC .......................................................... 726/28
See application file for complete search history.

(56) References Cited

U.S. PATENT DOCUMENTS

| | | | | |
|---|---|---|---|---|
| 8,473,880 | B1 * | 6/2013 | Bennett ................ | G06F 30/327 716/104 |
| 8,595,064 | B1 * | 11/2013 | Hagy .................... | G06Q 30/02 705/14.1 |
| 9,111,114 | B1 * | 8/2015 | Choi ................... | G06F 21/6227 |
| 9,244,976 | B1 * | 1/2016 | Zhang ................ | G06F 16/2453 |
| 9,659,040 | B1 * | 5/2017 | Bellingan ............ | G06F 16/213 |
| 9,824,095 | B1 * | 11/2017 | Taylor ................... | G06F 16/11 |
| 10,044,723 | B1 * | 8/2018 | Fischer ................ | H04L 63/102 |
| 10,824,751 | B1 * | 11/2020 | Kurian ................. | G06F 16/282 |
| 11,366,920 | B1 * | 6/2022 | Carru ................... | G06F 16/256 |
| 11,487,893 | B1 * | 11/2022 | Carru ................... | G06F 16/256 |
| 11,580,245 | B1 * | 2/2023 | Carru ................... | G06F 16/21 |
| 11,704,338 | B1 * | 7/2023 | Chu ......................... | G06F 16/27 707/610 |
| 2002/0116385 | A1 * | 8/2002 | Kagalwala .......... | G06F 21/6218 |
| 2006/0248083 | A1 * | 11/2006 | Sack ................... | G06F 21/6218 707/999.009 |
| 2008/0086482 | A1 * | 4/2008 | Weissman .......... | G06F 16/2365 |
| 2008/0221964 | A1 * | 9/2008 | Berkovitz ............. | G06Q 30/02 705/80 |
| 2009/0190584 | A1 * | 7/2009 | Gemmer ................ | H04Q 11/04 370/389 |
| 2010/0100461 | A1 * | 4/2010 | Laing .................... | G06Q 20/40 709/204 |
| 2011/0087646 | A1 * | 4/2011 | Dalvi ................... | G06F 16/951 707/E17.108 |
| 2011/0238553 | A1 * | 9/2011 | Raj ........................ | G06Q 20/40 705/37 |
| 2011/0265188 | A1 * | 10/2011 | Ramaswamy .......... | G06F 3/048 715/764 |
| 2011/0321159 | A1 * | 12/2011 | Nestler .............. | G06F 21/6218 726/21 |
| 2012/0254258 | A1 * | 10/2012 | Gao ........................ | G06F 16/21 707/E17.005 |
| 2013/0031136 | A1 * | 1/2013 | Shah ................... | G06F 21/6218 707/783 |
| 2013/0262685 | A1 * | 10/2013 | Shelton ................ | G06F 1/3203 709/226 |
| 2014/0108794 | A1 * | 4/2014 | Barton ................ | H04L 63/0428 713/165 |
| 2015/0074747 | A1 * | 3/2015 | Philip ................ | G06Q 10/0633 726/1 |
| 2015/0326580 | A1 * | 11/2015 | McMillan ............... | G16Z 99/00 726/4 |
| 2016/0057151 | A1 * | 2/2016 | Brock .................... | H04L 67/02 726/4 |
| 2016/0072817 | A1 * | 3/2016 | Makhervaks .......... | H04L 63/20 726/3 |
| 2016/0098572 | A1 * | 4/2016 | Povalyayev .......... | H04L 63/102 726/28 |
| 2016/0134929 | A1 * | 5/2016 | Robii ................. | H04N 21/4508 725/81 |
| 2017/0169059 | A1 * | 6/2017 | Horowitz .............. | G06F 16/211 |
| 2018/0196955 | A1 * | 7/2018 | Dageville ........... | G06F 21/6218 |
| 2018/0315053 | A1 * | 11/2018 | Schukai ............... | G06Q 20/405 |
| 2020/0042737 | A1 * | 2/2020 | Lee ...................... | G06F 21/6218 |
| 2021/0043284 | A1 * | 2/2021 | Liphardt ............... | G16H 10/60 |
| 2021/0157948 | A1 * | 5/2021 | Avanes ................. | G06F 16/221 |
| 2022/0035556 | A1 * | 2/2022 | Cashman ............... | G06F 12/10 |
| 2022/0150256 | A1 * | 5/2022 | Kapoor .............. | G06F 21/6218 |
| 2022/0335263 | A1 * | 10/2022 | Balgañón Canela ....................... | G06Q 30/0226 |
| 2022/0358141 | A1 * | 11/2022 | Chu ...................... | G06F 16/245 |
| 2023/0063911 | A1 * | 3/2023 | Carru .................. | G06F 21/6218 |

FOREIGN PATENT DOCUMENTS

| | | | | | |
|---|---|---|---|---|---|
| CN | 111311425 | A | * | 6/2020 | |
| CN | 114722408 | A | * | 7/2022 | |
| JP | 2006048423 | A | * | 2/2006 | |
| WO | WO-0017824 | A1 | * | 3/2000 | ............. G07C 13/00 |
| WO | WO-2019046204 | A1 | * | 3/2019 | .......... B60W 50/082 |
| WO | WO-2023027879 | A1 | * | 3/2023 | ............. G06F 16/21 |

OTHER PUBLICATIONS

Sharing Data Securely Across Regions and Cloud Platforms, Sep. 2, 2019, 7 pages. (Year: 2019).*

Steele, Robert, and Kyongho Min. "Role-based access to portable personal health records." In 2009 International Conference on Management and Service Science, pp. 1-4. IEEE, 2009. (Year: 2009).*

Faynberg, Igor, Hui-Lan Lu, and Herbert Ristock. "On dynamic access control in Web 2.0 and beyond: Trends and technologies." Bell Labs Technical Journal 16, No. 2 (2011): 199-218. (Year: 2011).*

Pereira. "Role-based access control for grid database services using the community authorization service." IEEE Transactions on Dependable and Secure Computing 3, No. 2 (2006): 156-166. (Year: 2006).*

Kormpakis. "Energy Sector Digitilisation: A Security Framework Application for Role-Based Access Management." In 2023 14th International Conference on Information, Intelligence, Systems & Applications (IISA), pp. 1-10. IEEE, 2023. (Year: 2023).*

Hu, Xiaorong. "Role-based concurrent control and its realization in CSCL." In 2013 IEEE Third International Conference on Information Science and Technology (ICIST), pp. 377-379. IEEE, 2013. (Year: 2013).*

Tsai, Wei-Tek, and Qihong Shao. "Role-based access-control using reference ontology in clouds." In 2011 Tenth International Symposium on Autonomous Decentralized Systems, pp. 121-128. IEEE, 2011. (Year: 2011).*

* cited by examiner

SYSTEMS AND METHODS FOR MANAGING DATABASE-LEVEL ROLES FOR DATA SHARING

TECHNICAL FIELD

Among other technical fields, embodiments of the present disclosure pertain to managing access to shared data.

BACKGROUND

Database systems are widely used for data storage and data access in computing and communication contexts. With respect to architecture, a database system could be an on-premises database system, a network-based database system (e.g., a cloud-based database system), a combination of the two, and/or include another type of architecture. With respect to type of data processing, a database system could implement online transactional processing (OLTP), online analytical processing (OLAP), a combination of the two, and/or another type of data processing. Moreover, a database system could be or include a relational database management system (RDBMS) and/or one or more other types of database management systems.

In a typical implementation, a database system includes one or more databases that are maintained on behalf of a customer account. Indeed, a database system may include one or more databases that are respectively maintained in association with any number of customer accounts. It may occur from time to time that users associated with two different customer accounts wish to share data with one another. It can be challenging, however, to do so in a secure and scalable manner.

A given database system may also include one or more databases that are maintained in connection with one or more system (e.g., administrative) accounts of the database system, one or more other databases that are used for administrative purposes, and/or one or more other databases that are maintained in association with one or more other organizations and/or for any other purposes. A database system may store metadata in association with the database system in general and in association with particular databases and/or particular customer accounts as well. Metadata that is maintained by a database system with respect to stored data (e.g., stored customer data) may be referred to herein at times as "expression properties."

Users and/or executing processes (that may be associated with, e.g., a given customer account of a database system) may, via one or more types of clients, be able to cause data to be ingested into one or more databases in the database system, and may also be able to manipulate the data, run queries against the data, create customized views (which are also known as secure views, materialized views, and the like) of the data, modify the data, insert additional data, remove data, and/or the like. Some example types of clients include web interfaces, Java Database Connectivity (JDBC) drivers, Open Database Connectivity (ODBC) drivers, one or more other types of drivers, desktop applications, mobile apps, and the like.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
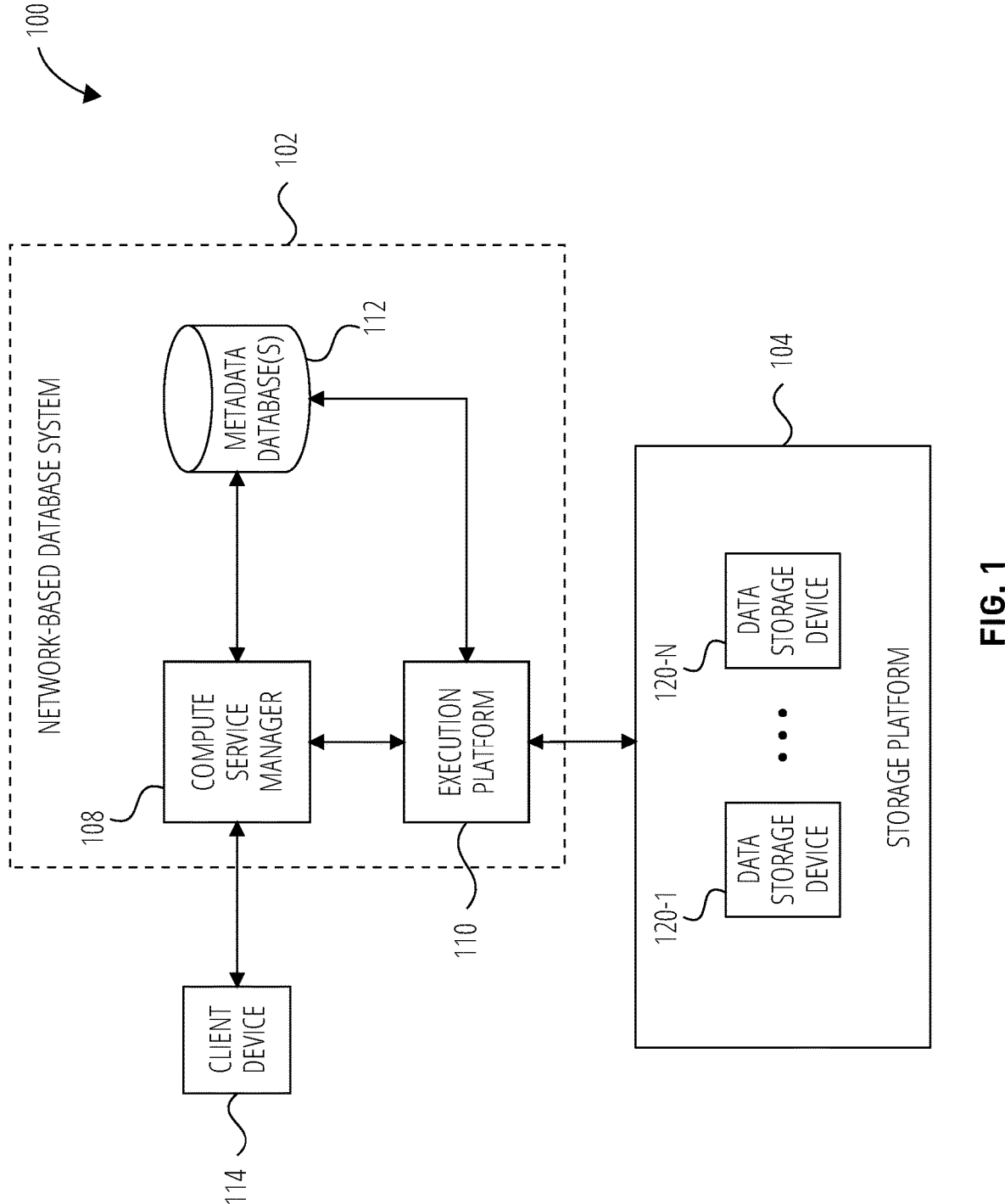
FIG. 1 illustrates an example computing environment in which an example network-based database system can be implemented, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, there are times when users associated with two different customer accounts on a given database system share data with one another. Some such instances involve a two-way sharing model—for example, two companies may share their customer lists with each other. There are other scenarios, however, in which the data-sharing model is more of a one-way street. This disclosure includes description of example data-sharing scenarios in which the data-sharing relationship is described as being between (i) a company (or organization or an individual, etc.) that is referred to herein as a "data provider" and (ii) a company (or, again, an organization or an individual, etc.) that is referred to herein as a "data consumer." As one would expect from those names, a given data provider provides data that is consumed by one or more data consumers.

One example embodiment takes the form of a method that includes sharing a provider-side database that resides in a data-provider account of a database system with a data-consumer account of the database system, where the provider-side database includes a provider-side database-level role. The method also includes receiving a database-role-grant request to grant the provider-side database-level role to a consumer-side account-level role in the data-consumer account; and performing, responsive to receiving the database-role-grant request, a set of database-role-granting operations including: granting a hidden provider-side database-level role in the data-provider account to a hidden consumer-side database-level role in the data-consumer account, the hidden provider-side database-level role having been granted to the provider-side database-level role; and granting the hidden consumer-side database-level role to the consumer-side account-level role in the data-consumer account.

Another embodiment takes the form of a system that includes at least one processor, and that also includes a computer-storage medium containing instructions executable by the at least one processor for causing the at least one processor to perform at least the operations that are listed in the preceding paragraph. Still another embodiment takes the form of a computer-storage medium containing instructions executable by the at least one processor for causing the at least one processor to perform at least the operations that are listed in the preceding paragraph.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment, a computer-storage-medium embodiment, and/or one or more other types of embodiments. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment 100 may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses.") The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, the metadata database(s) 112 may include a summary of data stored in remote data storage systems as well as data available from a local cache. Additionally, metadata database(s) 112 may include information regarding how data is partitioned and organized in remote data-storage systems (e.g., the cloud storage platform 104) and local caches. As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query, and scanning only the pertinent micro-partitions to respond to the query.

Metadata may be automatically gathered on all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata database 112 (e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service managers 108, metadata databases 112, execution platforms 110, and cloud storage platforms 104 may be implemented as a distributed system (e.g., distributed across multiple systems/platforms at multiple geographic locations). Additionally, each of the compute service managers 108, metadata databases 112, execution platforms 110, and cloud storage platforms 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
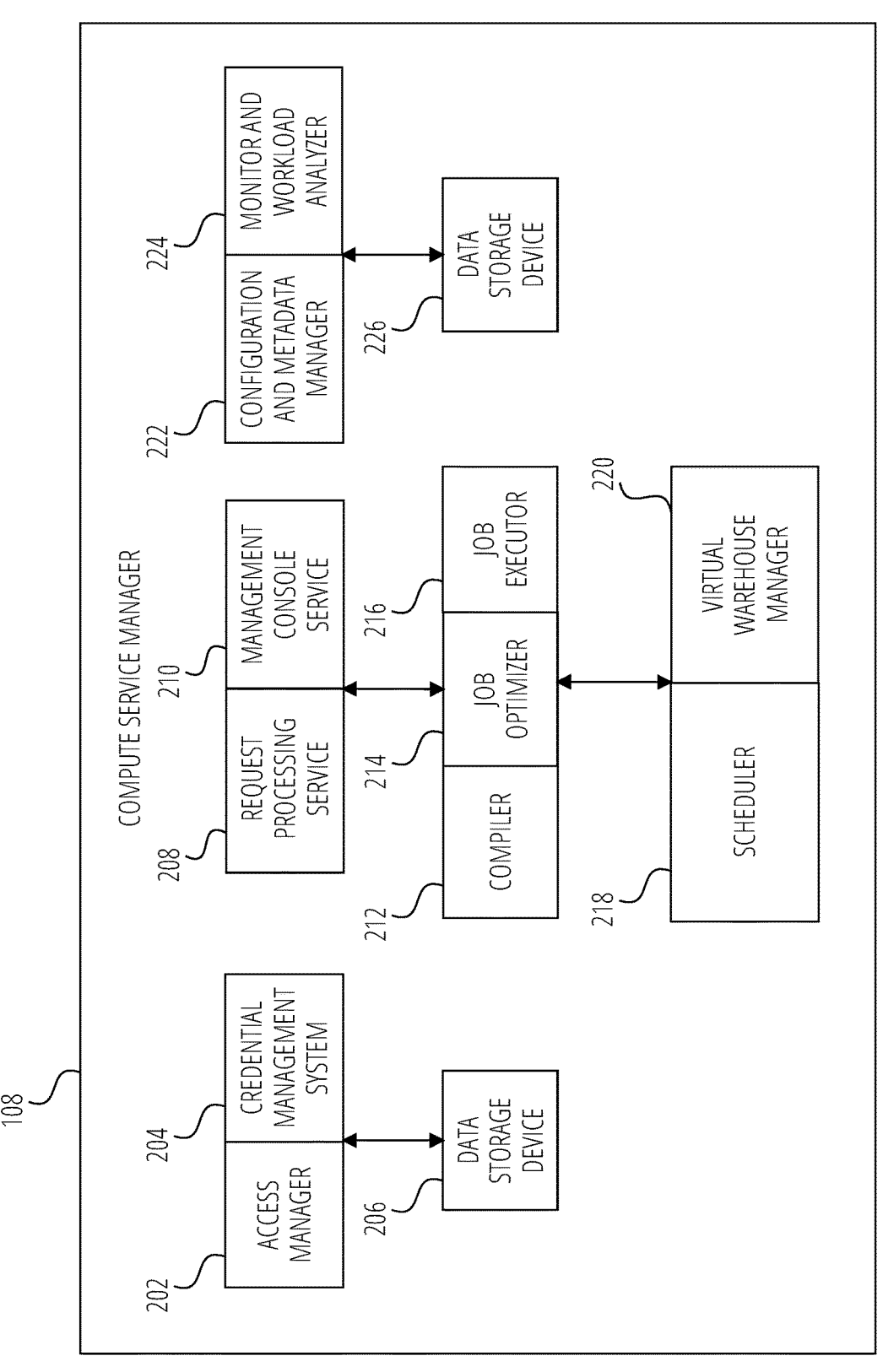
FIG. 2 is a diagram illustrating components of an example compute service manager, according to some example embodiments.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to a data storage device 206, which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., an access metadata database in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a compiler 212, a job optimizer 214, and a job executor 216. The compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A scheduler 218 sends received jobs to the appropriate services or systems for compilation, optimization, and dispatch to the execution platform 110 of FIG. 1. For example, jobs may be prioritized and then processed in that prioritized order. In an embodiment, the scheduler 218 determines a priority for internal jobs that are scheduled by the compute service manager 108 of FIG. 1 with other "outside" jobs such as user queries that may be scheduled by other systems in the database but may utilize the same processing resources in the execution platform 110. In some embodiments, the scheduler 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 represents any data storage device within the network-based database system 102. For example, data storage device 226 may represent buffers in execution platform 110, storage devices in cloud storage platform 104, or any other storage device.

Figure 3:
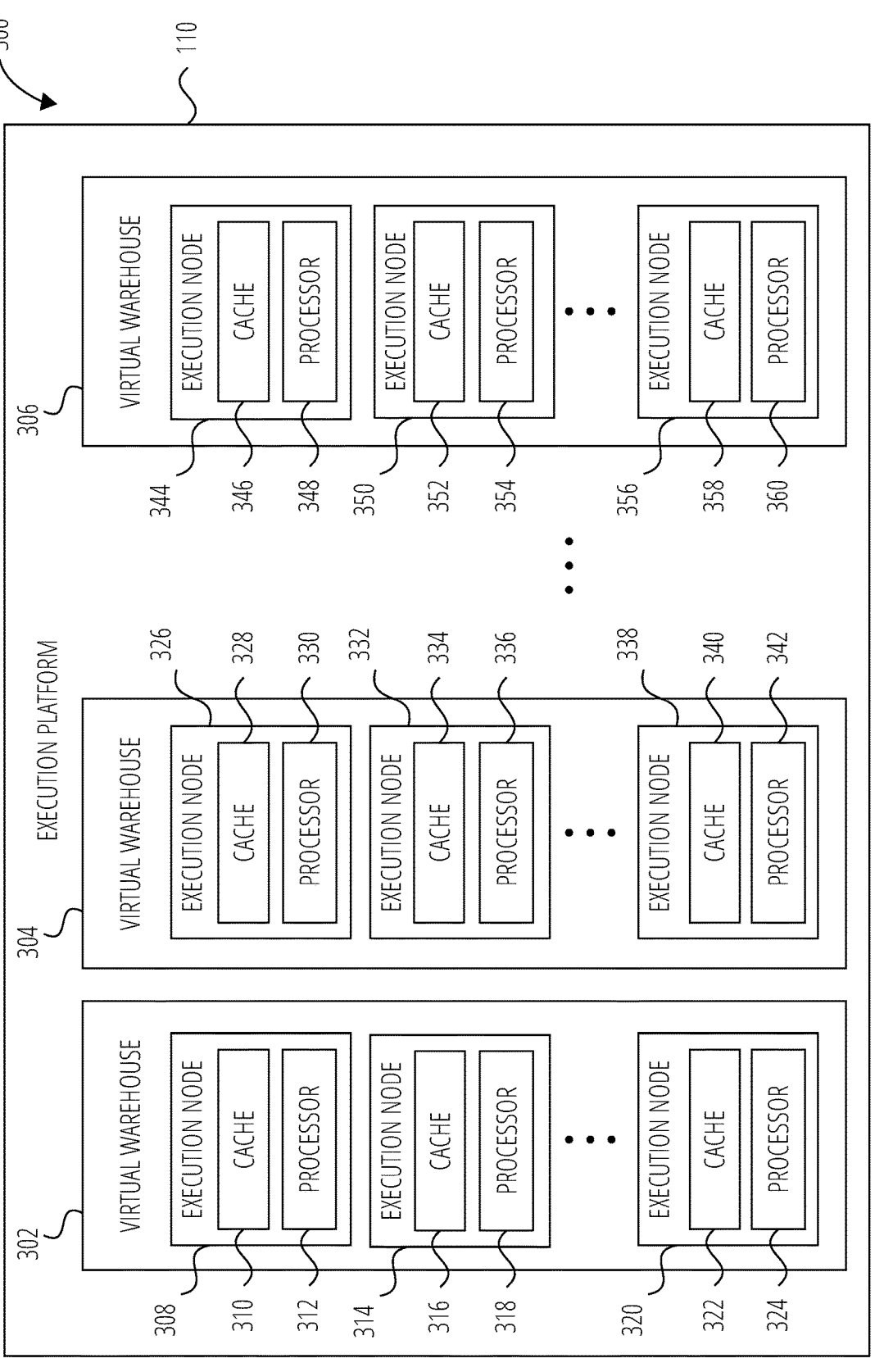
FIG. 3 is a block diagram illustrating components of an example execution platform, according to some example embodiments.

FIG. 3 is a block diagram illustrating components of the execution platform 110 of FIG. 1, in accordance with some embodiments of the present disclosure. As shown in FIG. 3, the execution platform 110 includes multiple virtual warehouses, including virtual warehouse 302, virtual warehouse 304, and virtual warehouse 306. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in shared database storage such as the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices shown in FIG. 1. Thus, the virtual warehouses are not necessarily assigned to a specific data storage device and, instead, can access data from any of the data storage devices within the cloud storage platform 104. Similarly, each of the execution nodes shown in FIG. 3 can access data from any of the data storage devices. In some embodiments, a particular virtual warehouse or a particular execution node may be temporarily assigned to a specific data storage device, but the virtual warehouse or execution node may later access data from any other data storage device.

In the example of FIG. 3, virtual warehouse 302 includes three execution nodes: an execution node 308, an execution node 314, and an execution node 320. Execution node 308 includes a cache 310 and a processor 312. Execution node 314 includes a cache 316 and a processor 318. Execution node 320 includes a cache 322 and a processor 324. Each of the execution node 308, the execution node 314, and the execution node 320 is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 302 discussed above, virtual warehouse 304 includes three execution nodes: an execution node 326, and execution node 332, and an execution node 338. Execution node 326 includes a cache 328 and a processor 330. Execution node 332 includes a cache 334 and a processor 336. Execution node 338 includes a cache 340 and a processor 342. Additionally, virtual warehouse 306 includes three execution nodes: an execution node 344, an execution node 350, and an execution node 356. Execution node 344 includes a cache 346 and a processor 348. Execution node 350 includes a cache 352 and a processor 354. Execution node 356 includes a cache 358 and a processor 360.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104 of FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although the depicted virtual warehouses are associated with the same execution platform 110, the virtual warehouses may be implemented using multiple computing systems at multiple geographic locations. For example, virtual warehouse 302 can be implemented by a computing system at a first geographic location, while virtual warehouse 304 and virtual warehouse 306 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 302 implements execution node 308 and execution node 314 on one computing platform at a geographic location and implements execution node 320 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

The execution platform 110 is also fault tolerant in at least one embodiment. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in the cloud storage platform 104 but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

As discussed above, data warehousing and data processing systems can allow execution of multiple tasks concurrently using the same set of computing clusters. In some embodiments the tasks are referred to as queries or statements that are issued usually in a database language such as SQL. There exist practical limits as to how many concurrent tasks can be executed on a given cluster, and how many tasks should be executed so as to not reduce the performance of the cluster. It is preferential to determine the optimal number of concurrent tasks for each execution case, such that the compute clusters are utilized as much is possible without exceeding the optimal limits which is difficult because the myriad of different execution paths per case creates dynamically changing computing loads and can be difficult to not overrun or exceed the optimal limit. In some example embodiments, an optimal number of tasks is not fixed (e.g., not a fixed number) and rather depends on the specific type of tasks and task coordination that a case (e.g., query plan, application) seeks to execute on the computing cluster. In particular, and in accordance with some example embodiments, an optimal number of queries depends on characteristics of each task, and more specifically the requirements that these tasks impose on the computing cluster in terms of resources (e.g., processor, memory, storage such as space and bandwidth, and network).

Various example data-sharing arrangements are described below in connection with FIG. 4, FIG. 5, FIG. 6, and FIG. 7, and an example method is described in connection with FIG. 8. In those four data-sharing-arrangement figures, hardware details that are presented in and discussed in connection with other figures are left out to facilitate clearer presentation. In each of the four data-sharing-arrangement figures, two example customer accounts maintained by the network-based database system 102 are shown: a data-provider account and a data-consumer account. These data-sharing-arrangement figures are presented here by way of example and not limitation.

Furthermore, in the below description of the four data-sharing-arrangement figures, there are role objects that reside inside databases. They are referred to as "database roles," and they exist and are defined only inside of the "container" that is the corresponding database. There are also what are referred to as "account-level roles," and they are accordingly depicted inside a respective customer account but outside of any other data objects. There are also additional account-level objects such as "share objects" (or just "shares") and "mounted databases." The various share objects also have objects referred to as "roles" defined therein. Thus, in at least some embodiments, there is a hierarchy of data objects with customer accounts being at the top level, account-level objects being at the next level down, and nested objects defined within various different account-level objects being at yet a next level down. This architecture is presented by way of example. Unless stated otherwise, each object is essentially its own namespace, such that objects of the same type having the same name would collide inside a given object, but objects defined within a given object are not subject to name collisions outside that given object (or at a different level within that object, and so on).

Figure 4:
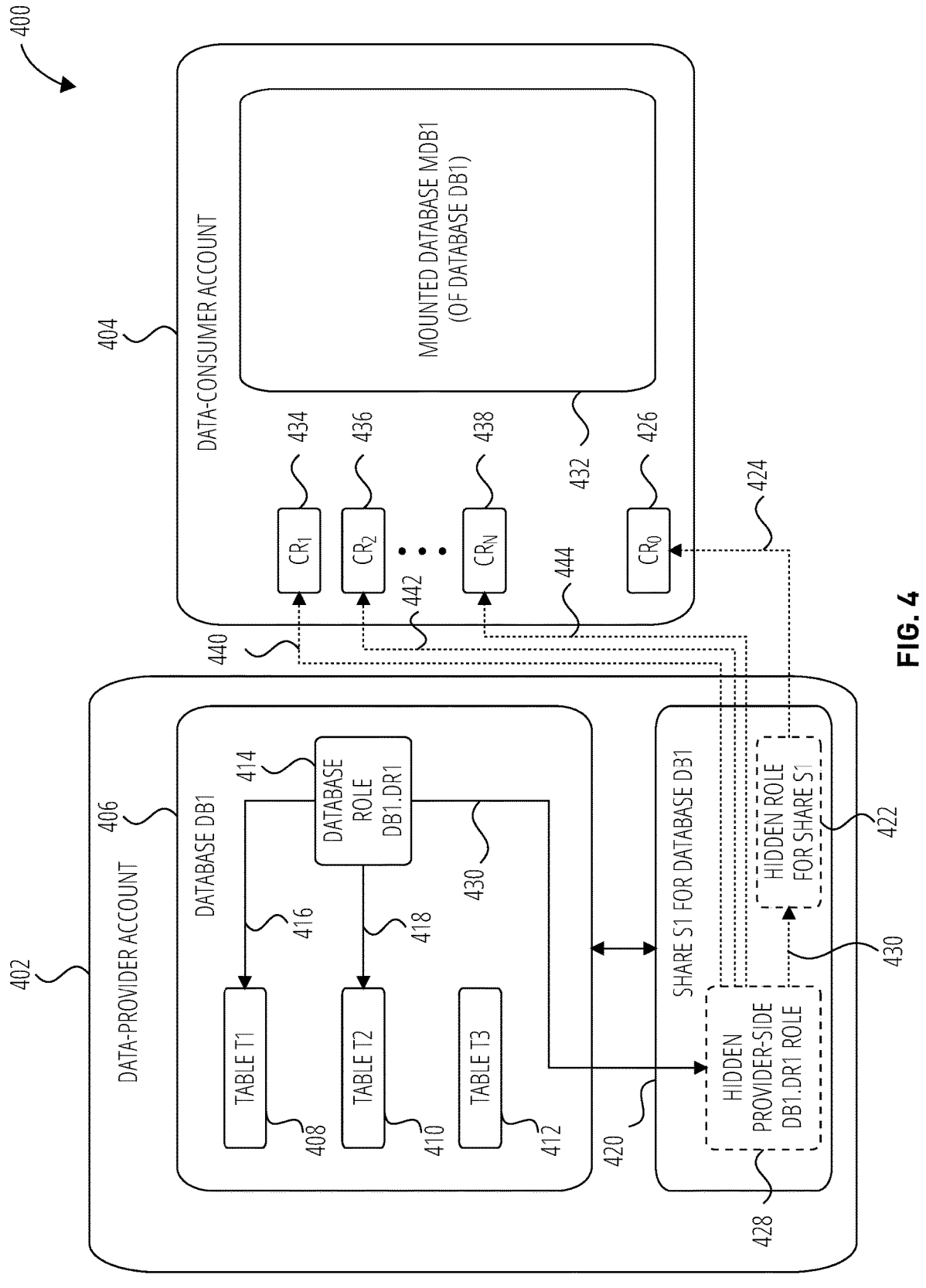
FIG. 4 depicts a first example data-sharing arrangement, according to some example embodiments.

FIG. 4 depicts an example data-sharing arrangement 400, in accordance with at least one embodiment. In the example data-sharing arrangement 400, there is a data-provider account 402 and a data-consumer account 404. The data-provider account 402 includes an example database DB1 406, which itself includes three example tables: a table T1 408, a table T2 410, and a table T3 412. The database DB1 406 also includes a database role DB1.DR1 414, which, as depicted by an access arrow 416 and an access arrow 418, has access to both the table T1 408 and the table T2 410 but not to the table T3 412.

In this example (and those depicted in and described in connection with each of the next three figures), a data-provider account (e.g., a user defined in the data-provider account) wishes to share a database with a data-consumer account, and further to enable that data-consumer account to grant a database role (defined in the shared database) to, e.g., account-level roles in the data-consumer account. For example, in FIG. 4, the data-provider account 402 wishes to share the database DB1 406 with the data-consumer account 404, and further wishes to enable the data-consumer account 404 to grant the database role DB1.DR1 414 to one or more account-level roles in the data-consumer account 404.

In at least some embodiments, including in the example embodiments described herein, the granting of a given first role to a given second role gives that second role the privileges held by the first role (which could change from time to time) until the revoking of the first role from the second role. In any given account, as one example, an account-level role could be granted to an account-level user. For clarity of presentation, user objects are not explicitly depicted in the figures. Some example privileges include read access, write access, visibility, usage, one or more administrative privileges, and/or the like.

In order to share the database DB1 406 with the data-consumer account 404, a share object referred to here as a share S1 420 is created in the data-provider account 402 in association with the database DB1 406. In some implementations, the creation of the share S1 420 results in the programmatic creation of a hidden role for (and in) the share S1 420. That role is referred to here as a share-wide hidden role 422. It is noted that "hidden" roles (and any other "hidden" objects) are hidden in the sense of not being visible to users, where such users may have had granted to them a given account-level role.

As mentioned above, in this example, in addition to sharing the database DB1 406 via the share S1 420, the data-provider account 402 also wishes to add the database role DB1.DR1 414 to the share S1 420. This will enable a role (in, e.g., the data-consumer account 404) that is granted access to the share S1 420 to also have access to the database role DB1.DR1 414, including having the ability to grant the database role DB1.DR1 414 to other roles (e.g., other account-level roles in the data-consumer account 404). To add the database role DB1.DR1 414 to the share S1 420, a user in the data-provider account 402 may enter a command such as:

GRANT (430) DATABASE ROLE DB1.DR1 (414) TO SHARE S1 (420)

The entry of that command may result in (i) the creation in the share S1 420 of a hidden provider-side DB1.DR1 role 428 and (ii) a grant 430 of the database role DB1.DR1 414 to the hidden provider-side DB1.DR1 role 428. As depicted, in at least one embodiment, the hidden provider-side DB1.DR1 role 428 is also, via the grant 430, granted to the share-wide hidden role 422.

Thereafter, it may occur that an account-level role in the data-consumer account 404 executes a command to create, in the data-consumer account 404, what is described herein as a mounted database MDB1 432 of the database DB1 406 from the share S1 420. In this example, that account-level role is referred to as a consumer-side account-level role $CR_0$ 426, and is labeled $CR_0$ in FIG. 4. This labeling convention is adhered to for the other account-level roles in the data-consumer account 404, which are described below. The consumer-side account-level role $CR_0$ 426 may create the mounted database MDB1 432—of the database DB1 406 from the share S1 420—in the data-consumer account 404 by entering a command such as:

CREATE DATABASE MDB1 FROM SHARE DATA-PROVIDER-ACCOUNT-402. S1

After execution of that command, the requested mounted database MDB1 432 is created in the data-consumer account 404. In at least some implementations, a mounted database is not a full copy of the corresponding database; rather, it is a database of pointers (i.e., references) to the actual data residing in the corresponding database. This is sometimes referred to as the mounted database being a "shadow database" of the corresponding actual database. In this case, the mounted database MDB1 432 is a shadow database of the database DB1 406.

In at least one embodiment, in addition to the creation of the mounted database MDB1 432, the above command also results in a share-wide-hidden-role grant 424 of the share-wide hidden role 422 to the consumer-side account-level role $CR_0$ 426. This enables the data-consumer account 404, specifically any users to which the consumer-side account-level role $CR_0$ 426 has been granted, to access all objects shared by the data-provider account 402 using the share S1 420. Due to the previously described grant 430, that includes the database role DB1.DR1 414.

In this example, then, the data-provider account 402 has enabled the data-consumer account 404 (e.g., the consumer-side account-level role $CR_0$ 426) to grant the database role DB1.DR1 414 to one or more account-level roles in the data-consumer account 404. There could be any number of such account-level roles in the data-consumer account 404, as indicated by the sequence including a consumer-side account-level role $CR_1$ 434 (labeled "$CR_1$"), a consumer-side account-level role $CR_2$ 436 (labeled "$CR_2$"), all the way down to an unspecified Nth account-level role that is referred to here as a consumer-side account-level role $CR_N$ 438 (labeled "$CR_N$"). There could be one, two, or any other number of such account-level roles in the data-consumer account 404.

The consumer-side account-level roles other than the consumer-side account-level role $CR_0$ 426—in particular, the consumer-side account-level role $CR_1$ 434, the consumer-side account-level role $CR_2$ 436, through the consumer-side account-level role $CR_N$ 438—are collectively referred to herein as "the additional consumer-side account level roles." Moreover, even though that phrasing is plural, it should be understood that there could be just one additional consumer-side account-level role.

In the example that is depicted in FIG. 4, the data-consumer account 404 grants the database role DB1.DR1 414 to each of the additional consumer-side account-level roles. This is accomplished in FIG. 4 by a separate grant of the hidden provider-side DB1.DR1 role 428 to each of the additional consumer-side account level roles—in particular, there is a grant 440 of the hidden provider-side DB1.DR1 role 428 to the consumer-side account-level role $CR_1$ 434, a grant 442 of the hidden provider-side DB1.DR1 role 428 to the consumer-side account-level role $CR_2$ 436, through a grant 444 of the hidden provider-side DB1.DR1 role 428 to the consumer-side account-level role $CR_N$ 438.

From the perspective of the data-consumer account 404, it is the database role DB1.DR1 414 that is being granted to each of the additional consumer-side account level roles. To make the grants described at the end of the preceding paragraph, the data-consumer account 404 may use commands such as:

GRANT (440) DATABASE ROLE MDB1.DR1 (414) TO ROLE CR1 (434)

GRANT (442) DATABASE ROLE MDB1.DR1 (414) TO ROLE CR2 (436)

GRANT (444) DATABASE ROLE MDB1.DR1 (414) TO ROLE CRN (438)

In those three commands and other example commands provided in the present disclosure, the reference numerals in parentheses refer to the figures and are included just to aid the reader. Moreover, it is noted that the syntax "MDB1" is used because, in at least one embodiment, the database DB1 406 is not visible to the data-consumer account 404.

Moreover, using the consumer-side account-level role $CR_1$ 434 as an example, the combination of the (earlier) grant 430 and the grant 440 effectively grants the database role DB1.DR1 414 to the consumer-side account-level role $CR_1$ 434. Thus, the one or more privileges (and/or one or more other properties) granted by the data-provider account 402 to the database role DB1.DR1 414 are thereby granted to the consumer-side account-level role $CR_1$ 434, until such time as that grant may be revoked. For example, that grant could be revoked by the data-provider account 402 (e.g., the data-provider account 402 may decide to revoke the grant of the database role DB1.DR1 414 from the share S1 420, which would result in the additional consumer-side account-level roles no longer having the privileges of the database role DB1.DR1 414 (unless they have been granted one or more such privileges in some other way).

If and when it does occur that the data-provider account 402 revokes the grant 430 of the database role DB1.DR1 414 from the share S1 420, the network-based database system 102 may then perform a series of "tear-down" operations to undo whatever granting the data-consumer account 404 had done up to that point with respect to the additional consumer-side account-level roles. Thus, in at least one embodiment, the network-based database system 102 would tear down every grant of the hidden provider-side DB1.DR1 role 428 to one of the additional consumer-side account-level roles. As such, whatever the value of "N" is, that is how many revocations of grants would be performed by the network-based database system 102.

Figure 5:
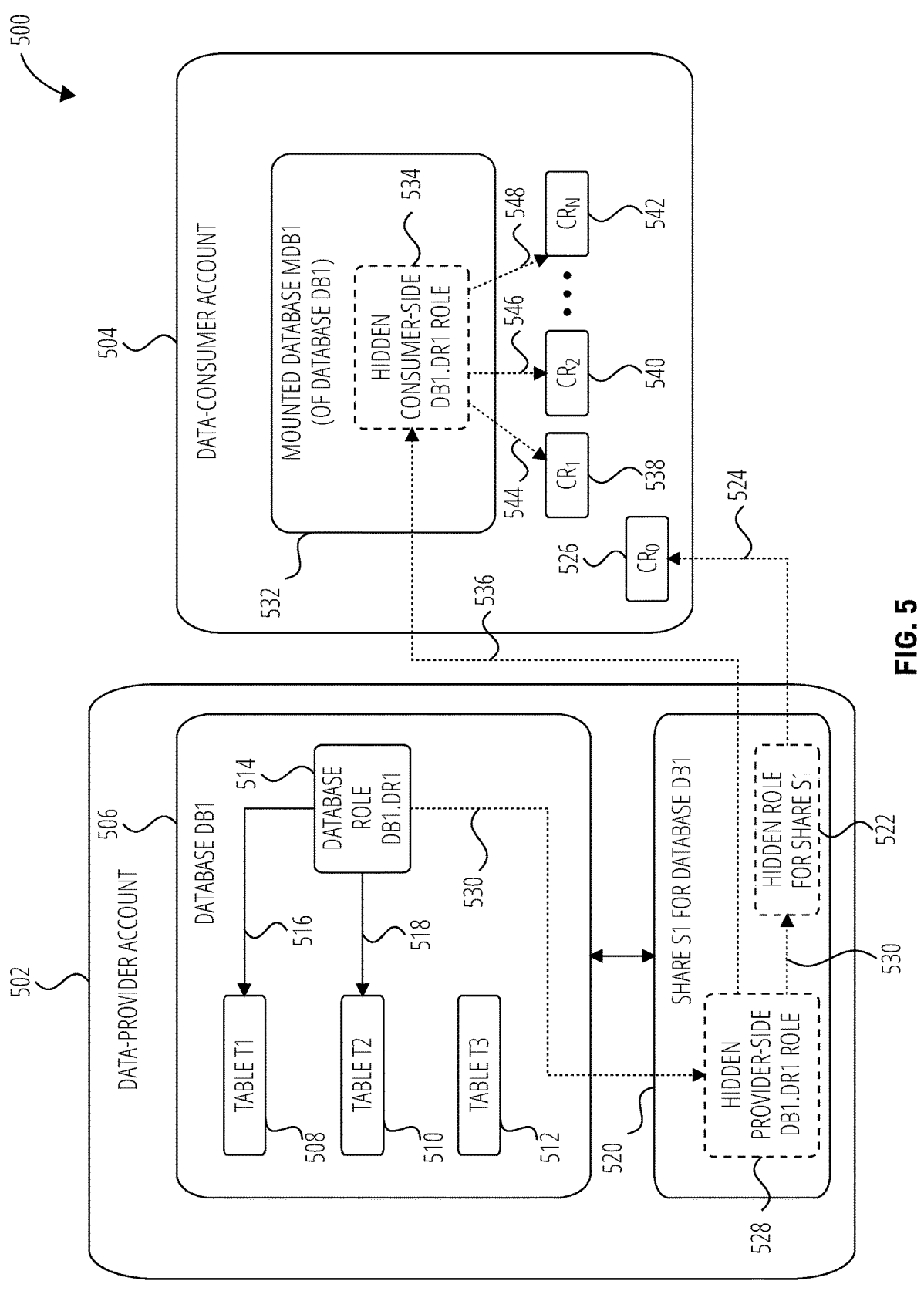
FIG. 5 depicts a second example data-sharing arrangement, according to some example embodiments.

FIG. 5 depicts an example data-sharing arrangement 500, in accordance with at least one embodiment. There are a number of elements in FIG. 5 that are parallel to respective elements in FIG. 4, and thus are not described here in as great of detail. Those elements include a data-provider account 502, a data-consumer account 504, a database DB1 506, a table T1 508, a table T2 510, a table T3 512, a database role DB1.DR1 514, an access arrow 516, an access arrow 518, a share S1 520, a share-wide hidden role 522, a share-wide-hidden-role grant 524, a consumer-side account-level role $CR_0$ 526, a hidden provider-side DB1.DR1 role 528, a grant 530, and a set of N additional consumer-side account level roles that includes a consumer-side account-level role $CR_1$ 538, a consumer-side account-level role $CR_2$ 540, through a consumer-side account-level role $CR_N$ 542.

Unlike the data-sharing arrangement 400 of FIG. 4, however, a mounted database MDB1 532 in the data-consumer account 504 includes-after commands are executed that result in its creation, as described below-what is referred to here as a hidden consumer-side DB1.DR1 role 534. As can be seen in FIG. 5, rather than granting the hidden provider-side DB1.DR1 role 528 directly to one (or more, or many) additional consumer-side account level roles, there is instead a grant 536 of the hidden provider-side DB1.DR1 role 528 to the hidden consumer-side DB1.DR1 role 534. The data-consumer account 504 (via, e.g., the consumer-side account-level role $CR_0$ 526) is still able to grant the database role DB1.DR1 514 to the additional consumer-side account-level roles with commands such as:

GRANT (536,544) DATABASE ROLE MDB1.DR1 (514) TO ROLE CR1 (538)

GRANT (546) DATABASE ROLE MDB1.DR1 (514) TO ROLE CR2 (540)

GRANT (548) DATABASE ROLE MDB1.DR1 (514) TO ROLE CRN (542)

This is identical syntax (other than reference numerals corresponding to the figures) to the example commands shown above in connection with FIG. 4. Under the hood (i.e., behind the scenes), however, the first of those commands would result in (i) the creation of the hidden consumer-side DB1.DR1 role 534 in the mounted database MDB1 532, (ii) the grant 536 of the hidden provider-side DB1.DR1 role 528 to the hidden consumer-side DB1.DR1 role 534, and (iii) a grant 544 of the hidden consumer-side DB1.DR1 role 534 to the consumer-side account-level role $CR_1$ 538. The second command would result only in a grant 546 of the hidden consumer-side DB1.DR1 role 534 to the consumer-side account-level role $CR_2$ 540, because the hidden consumer-side DB1.DR1 role 534 has already been created and the grant 536 has already been made. Similarly, the third command would result only in a grant 548 of the hidden consumer-side DB1.DR1 role 534 to the consumer-side account-level role $CR_N$ 542.

If and when the data-provider account 502 decides to revoke the grant 530 of the database role DB1.DR1 514 from the share S1 520, the only teardown that happens in at least one embodiment is the revocation (e.g., deletion) of the grant 536 (in addition to the revocation (e.g., deletion) of the grant 530 itself). In at least one embodiment, the one or more grants of the hidden consumer-side DB1.DR1 role 534 to the additional consumer-side account-level roles can just be left alone, and processing time need not be used up to delete however many grants of the hidden consumer-side DB1.DR1 role 534 the data-consumer account 504 made to the additional consumer-side account-level roles. If many such grants were made, the savings in processing resources and time could be significant as compared with the approach depicted in and described in connection with FIG. 4.

Thus, in at least one embodiment, hidden provider-side database roles are created on a per-database-role, per-share basis, such that each hidden provider-side database role corresponds to a unique pair of {database role, share}. Therefore, in at least one embodiment, with respect to share objects (e.g., the share S1 520), there is a nested-object relationship between share objects and hidden provider-side database roles. Accordingly, in at least one embodiment, when a given share gets deleted (e.g., as a result of being revoked), any hidden provider-side database role nested inside the given share also gets deleted.

Moreover, in at least one embodiment, hidden consumer-side database roles are created on a per-mounted-database, per-database-role basis, such that each hidden consumer-side database role corresponds to a unique pair of {mounted database, database role}. This latter sentence is depicted in and described in connection with FIG. 7. Thus, in at least one embodiment, with respect to mounted databases, there is a nested-object relationship between mounted databases and hidden consumer-side database roles. Accordingly, in at least one embodiment, when a given mounted database gets deleted, any hidden consumer-side database role nested inside the given mounted database also gets deleted.

Figure 6:
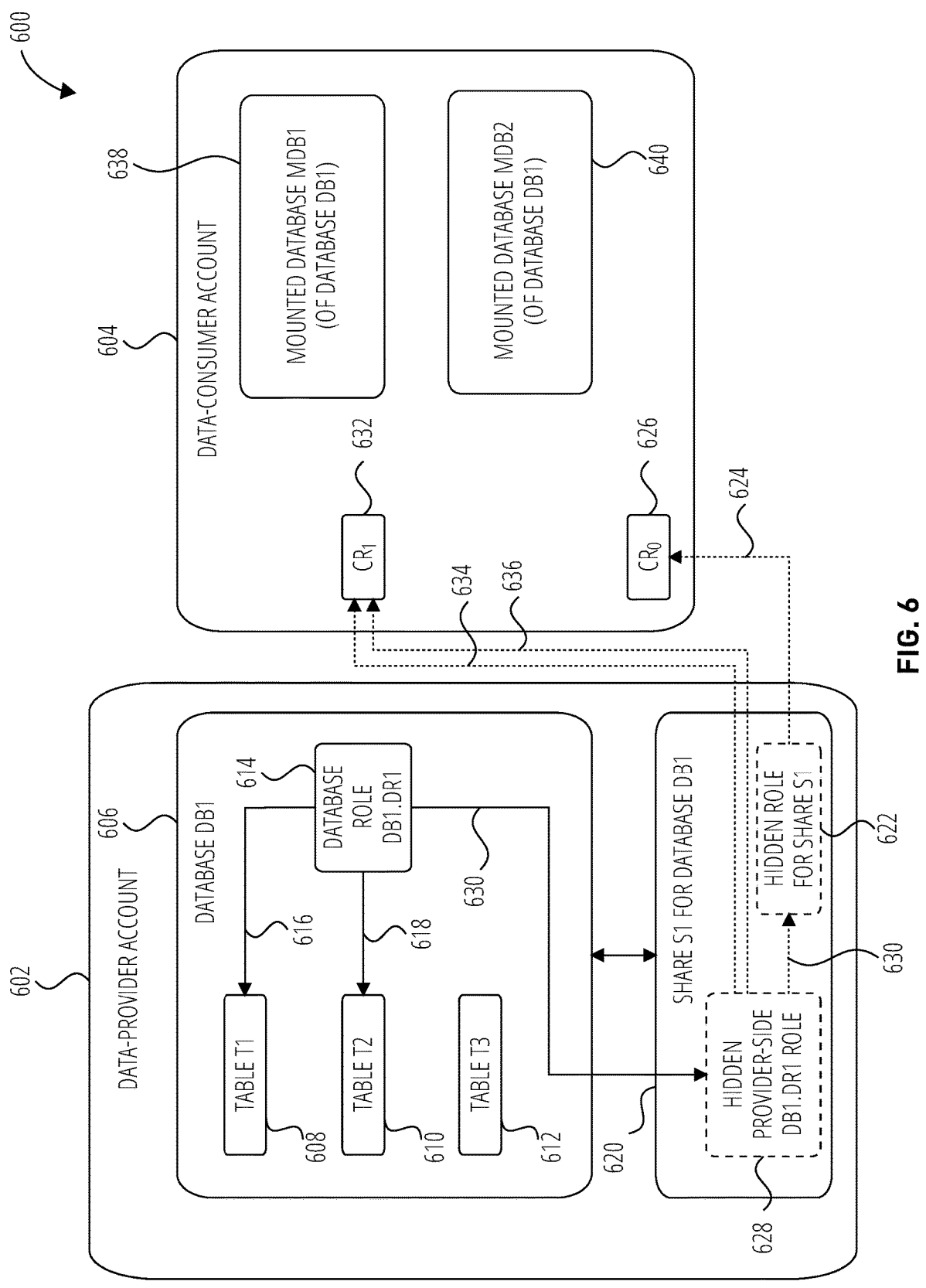
FIG. 6 depicts a third example data-sharing arrangement, according to some example embodiments.

FIG. 6 depicts an example data-sharing arrangement 600, in accordance with at least one embodiment. Many of the elements in the data-sharing arrangement 600 of FIG. 6 correspond to similar elements in the data-sharing arrangement 400 of FIG. 4, and thus are not described here in as great of detail. Those objects include a data-provider account 602, a data-consumer account 604, a database DB1 606, a table T1 608, a table T2 610, a table T3 612, a database role DB1.DR1 614, an access arrow 616, an access arrow 618, a share S1 620, a share-wide hidden role 622, a share-wide-hidden-role grant 624, a consumer-side account-level role $CR_0$ 626, a hidden provider-side DB1.DR1 role 628, a grant 630, and a consumer-side account-level role $CR_1$ 632.

Among the ways in which the data-sharing arrangement 600 of FIG. 6 is different than the data-sharing arrangement 400 of FIG. 4 is that there are not one, but two mounted databases in the data-consumer account 604. Those are a mounted database MDB1 638 and a mounted database MDB2 640. In this example, both the mounted database MDB1 638 and the mounted database MDB2 640 are shadow databases of the database DB1 606, shared with the data-consumer account 604 via the share S1 620. In some embodiments, the data-consumer account 604 is able to add local objects to a given mounted database and/or customize a given mounted database in one or more other ways. As such, it may be the case that the mounted database MDB1 638 is different from the mounted database MDB2 640 if, for example, the data-consumer account 604 has made changes to the mounted database MDB2 640 that the data-consumer account 604 did not make to the mounted database MDB1 638. Or different changes could have been made in each, among other possible scenarios.

Following the creation of the mounted database MDB1 638 and the mounted database MDB2 640, it may occur that the data-consumer account 604 twice grants—or at least twice attempts to grant—the database role DB1.DR1 614 to an additional consumer-side account-level role, once in connection with the mounted database MDB1 638 and then again in connection with the mounted database MDB2 640. In FIG. 6, these two grants are explicitly depicted as a grant

634 and a grant 636. In operation, they may be one and the same. That is, the grant 636 may not get created because the grant 634 already exists at that time. Thus, a user of the data-consumer account 604 may operate as if the database role DB1.DR1 614 has been separately granted to the consumer-side account-level role $CR_1$ 632 in connection with both the mounted database MDB1 638 and the mounted database MDB2 640, but that may not be the case. To make the two "different" grants, the user may enter at different times the following two commands:

GRANT (634) DATABASE ROLE MDB1.DR1 (614) TO ROLE CR1 (632)

GRANT (636) DATABASE ROLE MDB2.DR1 (614) TO ROLE CR1 (632)

While it may appear to the user that these are different grants due to the first command referencing the mounted database MDB1 638 and the second command referencing the mounted database MDB2 640, in actuality it can be seen that both commands grant the same database role to the same consumer-side account level role (i.e., the consumer-side account-level role $CR_1$ 632). Accordingly, such a user may not realize that revoking this grant of this database role with reference to the mounted database MDB1 638 will result in the revocation with respect to both mounted databases. It may actually just be a single deletion of a single grant (e.g., a deletion of the grant 634 in a situation in which the grant 636 is not there).

In an ostensible attempt to revoke the grant of the database role with respect to the mounted database MDB1 638 only, the user may input a command such as:

REVOKE DATABASE ROLE MDB1.DR1 (614) FROM ROLE CR1 (632)

It is noted that this command references the mounted database MDB1 638 and does not reference the mounted database MDB2 640. Nevertheless, as described above, execution of this command may have the effect of revoking the grant of that database role with respect to both mounted databases. One drawback with this design in the multi-mounted-database context, then, is the same as a drawback with the design of FIG. 4: both designs involve direct granting of a hidden provider-side database role (e.g., the hidden provider-side DB1.DR1 role 628) to a consumer-side account-level role (e.g., the consumer-side account-level role $CR_1$ 632). As such, "multiple" (i.e., apparently multiple) grants may actually be a single grant and thus the "multiple" grants will rise and fall "together."

Figure 7:
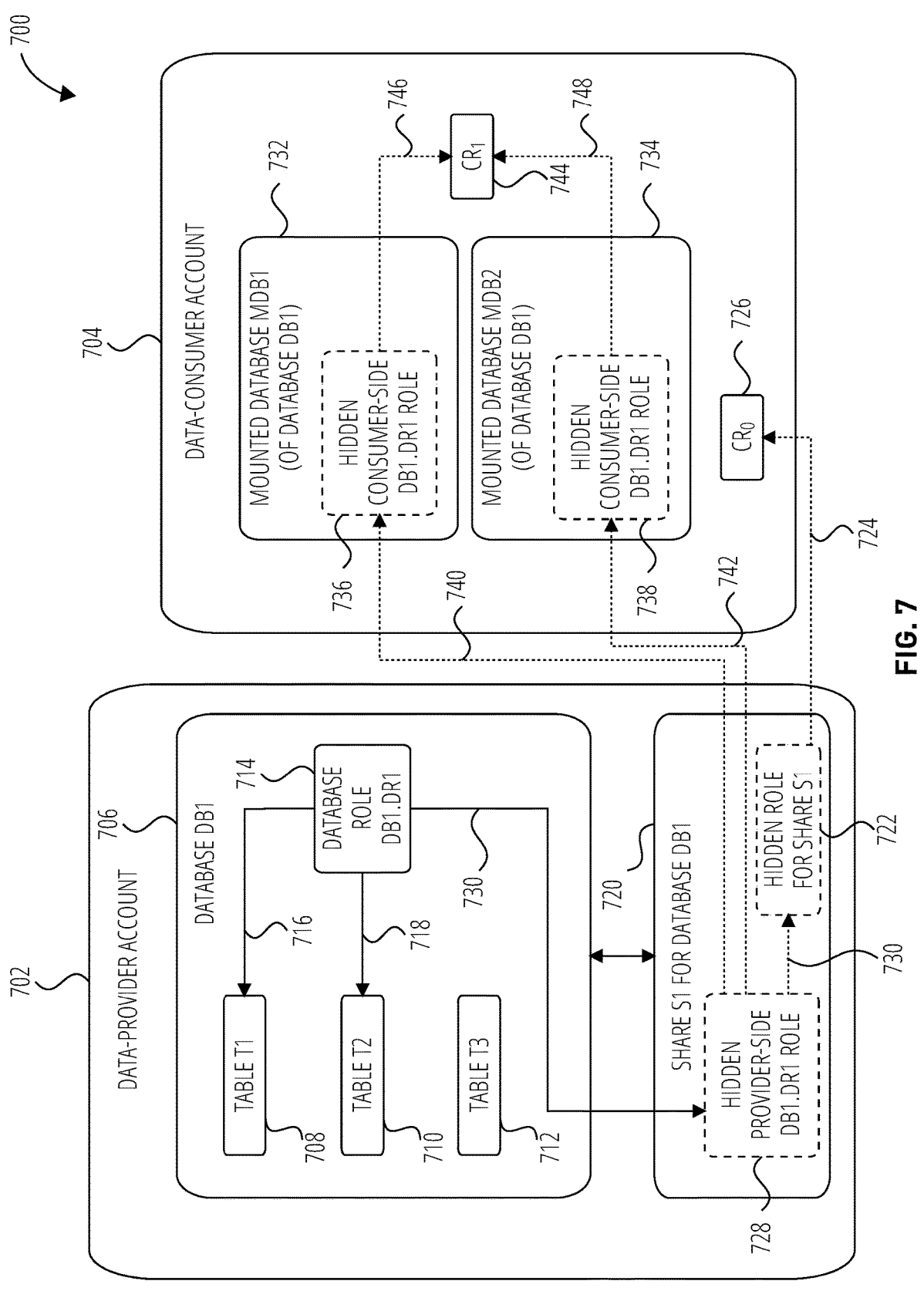
FIG. 7 depicts a fourth example data-sharing arrangement, according to some example embodiments.

FIG. 7 depicts an example data-sharing arrangement 700, in accordance with at least one embodiment. As with the previous two figures, there are a number of elements in FIG. 7 that are not described in detail here since they parallel similar elements in the previous three figures. These elements include a data-provider account 702, a data-consumer account 704, a database DB1 706, a table T1 708, a table T2 710, a table T3 712, a database role DB1.DR1 714, an access arrow 716, an access arrow 718, a share S1 720, a share-wide hidden role 722, a share-wide-hidden-role grant 724, a consumer-side account-level role $CR_0$ 726, a hidden provider-side DB1.DR1 role 728, a grant 730, and a consumer-side account-level role $CR_1$ 744.

Unlike the arrangement depicted in FIG. 6, the data-sharing arrangement 700 of FIG. 7 includes a separate hidden consumer-side database role in each of multiple mounted databases. In this example, there are two such pairs: a mounted database MDB1 732 that includes a hidden consumer-side DB1.DR1 role 736, and a mounted database MDB2 734 that includes a hidden consumer-side DB1.DR1 role 738. A user of the data-consumer account 704 may enter the following command to grant the database role DB1.DR1 714 to the consumer-side account-level role $CR_1$ 744 in connection with the mounted database MDB1 732:

> GRANT (740,746) DATABASE ROLE MDB1.DR1 (714) TO ROLE CR1 (744)

In at least one embodiment, this command results in (i) the creation of the hidden consumer-side DB1.DR1 role 736 in the mounted database MDB1 732, (ii) a grant 740 of the hidden provider-side DB1.DR1 role 728 to the hidden consumer-side DB1.DR1 role 736, and (iii) a grant 746 of the hidden consumer-side DB1.DR1 role 736 to the consumer-side account-level role $CR_1$ 744. The user (or another user, etc.) may thereafter enter the following command to grant the database role DB1.DR1 714 to the consumer-side account-level role $CR_1$ 744 in connection with the mounted database MDB2 734:

> GRANT (742,748) DATABASE ROLE MDB2.DR1 (714) TO ROLE CR1 (744)

In at least one embodiment, this command results in (i) the creation of the hidden consumer-side DB1.DR1 role 738 in the mounted database MDB2 734, (ii) a grant 742 of the hidden provider-side DB1.DR1 role 728 to the hidden consumer-side DB1.DR1 role 738, and (iii) a grant 748 of the hidden consumer-side DB1.DR1 role 738 to the consumer-side account-level role $CR_1$ 744. Note that the two previous grant commands are, other than reference numbers, the same as the two grant commands described above in connection with FIG. 6. However, due to the different architecture of the data-sharing arrangement 700 of FIG. 7 as opposed to the data-sharing arrangement 600 of FIG. 6, the following command will revoke only the granting of the database role DB1.DR1 714 to the consumer-side account-level role $CR_1$ 744 in connection with the mounted database MDB1 732:

> REVOKE DATABASE ROLE MDB1.DR1 (714) FROM ROLE CR1 (744)

This command will result in the teardown of the grant 746 of the hidden consumer-side DB1.DR1 role 736 to the consumer-side account-level role $CR_1$ 744. The grant 740 of the hidden provider-side DB1.DR1 role 728 to the hidden consumer-side DB1.DR1 role 736 may be left in place in case the data-consumer account 704 grants the database role DB1.DR1 714 to a different (or the same) additional consumer-side account level role. Importantly, absent an explicit revocation, the consumer-side account-level role $CR_1$ 744 will still be granted to the database role DB1.DR1 714 in connection with the mounted database MDB2 734. In at least one embodiment, in the event that the data-provider account revokes the database role DB1.DR1 714 from the share S1 720, the grant 740 would be torn down (as would the grant 742).

Figure 8:
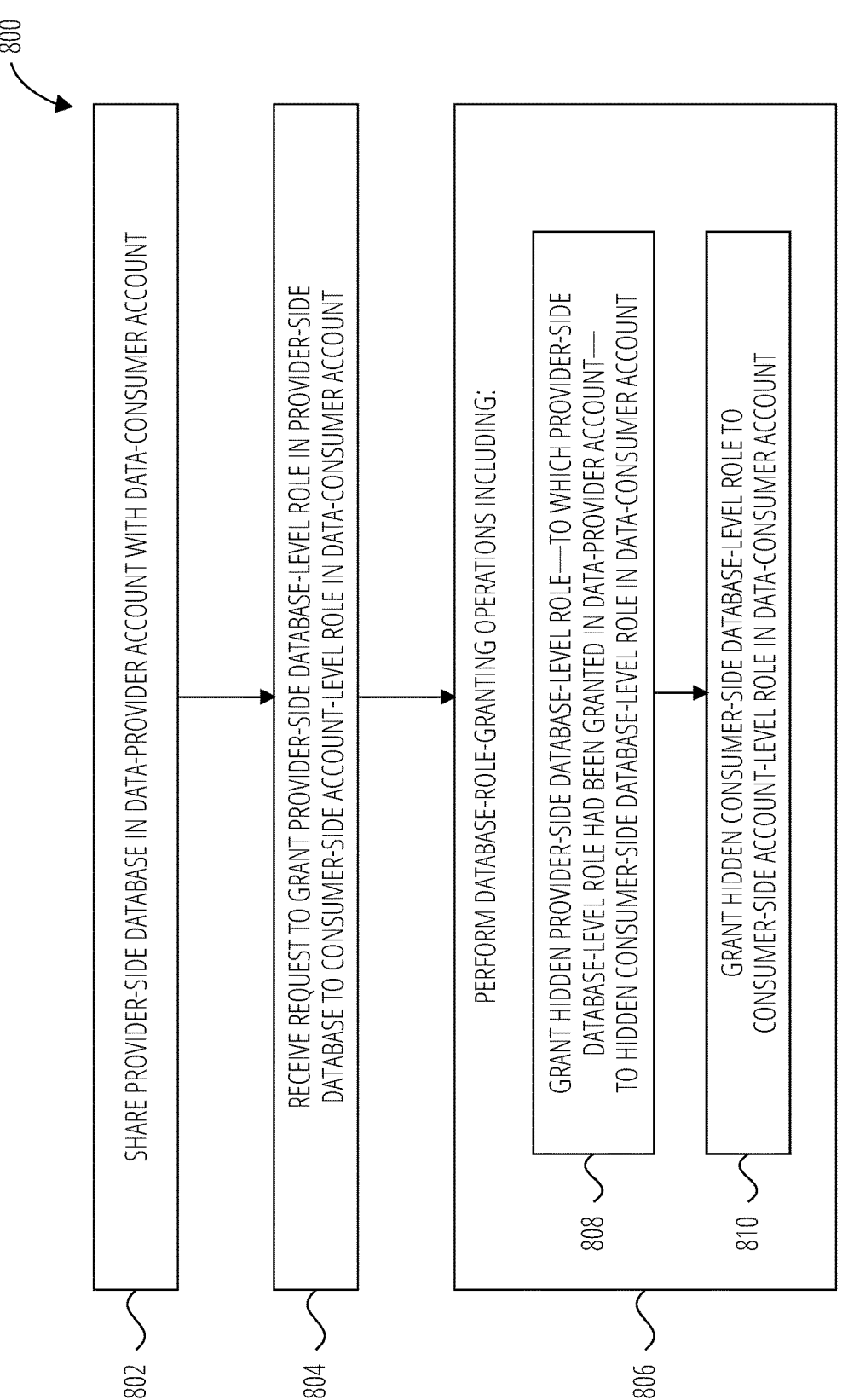
FIG. 8 depicts an example method, according to some example embodiments.

FIG. 8 is a schematic flow chart diagram illustrating an example method 800 for managing role grants in a database system. The method 800 could be performed by any one or more computing devices programmed to perform the described functions. The method 800 is described below by way of example as being performed by a network-based database system, though other types of database systems could be used as well, among other possibilities.

At operation 802, the network-based database system 102 shares a provider-side database that resides in a data-provider account of a database system with a data-consumer account of the database system, the provider-side database comprising a provider-side database-level role.

At operation 804, the network-based database system 102 receives a database-role-grant request to grant the provider-side database-level role to a consumer-side account-level role in the data-consumer account; and At operation 806, the network-based database system 102 performs, responsive to receiving the database-role-grant request, a set of database-role-granting operations that includes the below-described operation 808 and operation 810.

At operation 808, the network-based database system 102 grants a hidden provider-side database-level role in the data-provider account to a hidden consumer-side database-level role in the data-consumer account, the hidden provider-side database-level role having been granted to the provider-side database-level role; and At operation 810, the network-based database system 102 grants the hidden consumer-side database-level role to the consumer-side account-level role in the data-consumer account.

Figure 9:
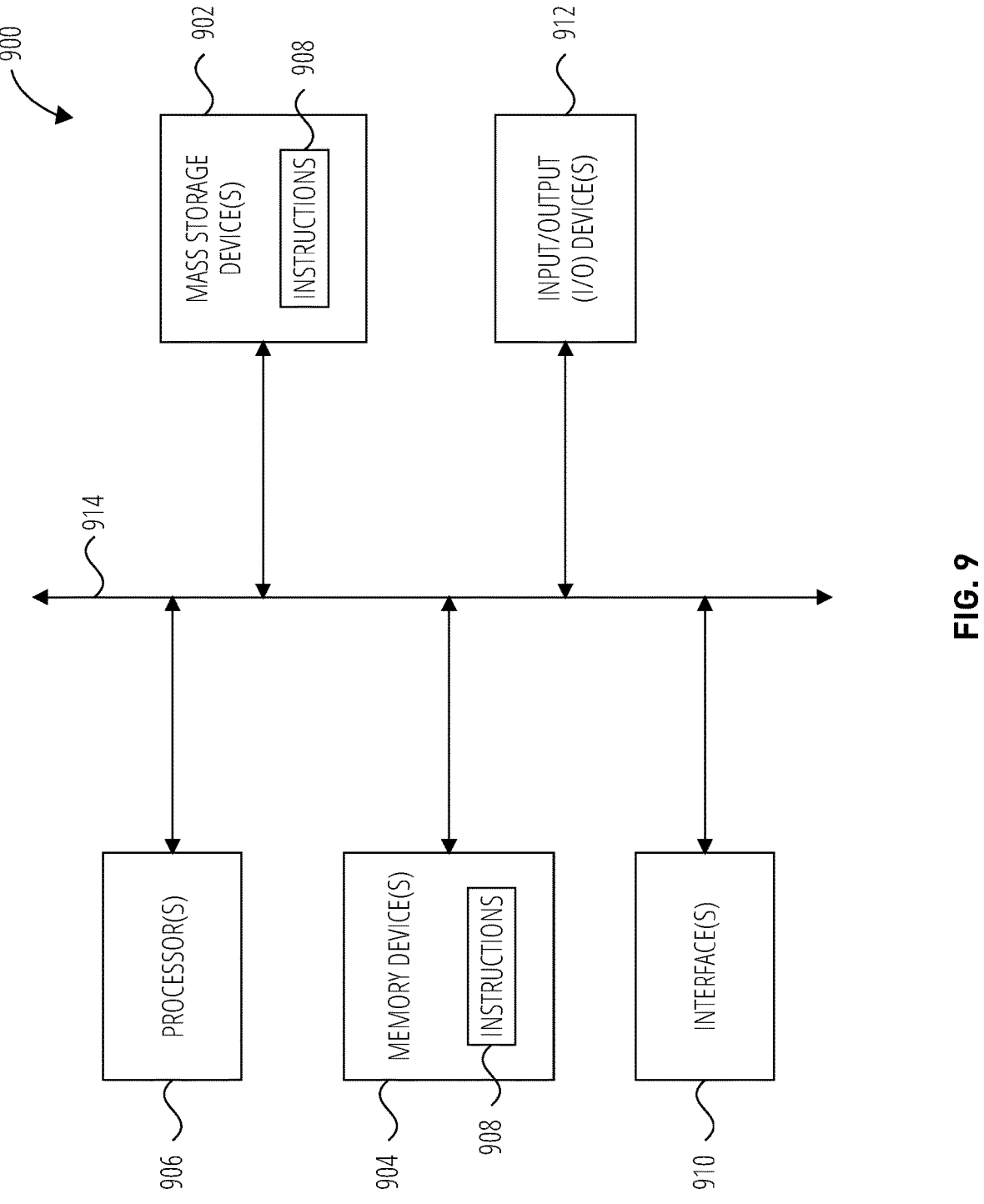
FIG. 9 depicts an example computing device, according to some example embodiments.

FIG. 9 is a block diagram depicting an example computing device 900. In some embodiments, computing device 900 is used to implement one or more of the components, systems, or platforms, etc. discussed herein. Moreover, the components, systems, or platforms, etc. discussed herein may include one or more of the computing device 900. Further, computing device 900 may interact with any of the systems and components described herein. Accordingly, computing device 900 may be used to perform various procedures and tasks, such as those discussed herein. The computing device 900 can function as a server, a client or any other computing entity. The computing device 900 can be any of a wide variety of computing devices, such as a desktop computer, a notebook computer, a server computer, a handheld computer, a tablet, and the like.

Computing device 900 includes one or more processor(s) 906, one or more memory device(s) 904, one or more interface(s) 910, one or more mass storage device(s) 902, and one or more input/output device(s) 912, all of which are coupled to a bus 914. Processor(s) 906 include one or more processors or controllers that execute instructions stored in memory device(s) 904 and/or mass storage device(s) 902. Processor(s) 906 may also include various types of computer-readable media, such as cache memory.

Memory device(s) 904 include various computer-readable media, such as volatile memory (e.g., random access memory (RAM)) and/or nonvolatile memory (e.g., read-only memory (ROM)). Memory device(s) 904 may also include rewritable ROM, such as Flash memory.

Mass storage device(s) 902 include various computer storage media, such as magnetic tapes, magnetic disks, optical disks, solid state memory (e.g., Flash memory), and so forth. Various drives may also be included in mass storage device(s) 902 to enable reading from and/or writing to the various computer readable media. Mass storage device(s) 902 include removable media and/or non-removable media.

The input/output device(s) 912 include various devices that allow data and/or other information to be input to or retrieved from computing device 900. Example input/output device(s) 912 include cursor control devices, keyboards, keypads, microphones, monitors or other display devices, speakers, printers, network interface cards, modems, lenses, CCDs or other image capture devices, and the like.

Interface(s) 910 include various interfaces that allow computing device 900 to interact with other systems, devices, or computing environments. Example interface(s) 910 include any number of different network interfaces, such as interfaces to local area networks (LANs), wide area networks (WANs), wireless networks, and the Internet.

Bus 914 allows processor(s) 906, memory device(s) 904, interface(s) 910, mass storage device(s) 902, and input/output device(s) 912 to communicate with one another, as well as other devices or components coupled to bus 914. Bus 914 represents one or more of several types of bus structures, such as a system bus, PCI bus, IEEE bus, USB bus, and so forth.

The various memories may store one or more sets of instructions 908 and data structures (e.g., software) embodying or utilized by any one or more of the methodologies or functions described herein. These instructions 908, when executed by the processor(s) 906, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, any network or portion network described herein may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, any network or portion network described herein may include a wireless or cellular network, and a utilized coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), World-wide Interoperability for Microwave Access (WiMAX), Long Term Evolution (LTE) standard, others defined by various standard-setting organizations, other long-range protocols, or other data transfer technology.

The instructions 908 may be transmitted or received over a network using a transmission medium via a network interface device (e.g., a network interface component) and utilizing any one of a number of well-known transfer protocols (e.g., hypertext transfer protocol (HTTP)). Similarly, the instructions 908 may be transmitted or received using a transmission medium via a coupling (e.g., a peer-to-peer coupling) to one or more devices. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 908 for execution by the computing device 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

As stated above, the terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

For purposes of illustration, programs and other executable program components are shown herein as discrete blocks, although it is understood that such programs and components may reside at various times in different storage components of the computing device 900 and are executed by the processor(s) 906. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In view of the disclosure above, a listing of various examples of embodiments is set forth below. It should be noted that one or more features of an example, taken in isolation or combination, should be considered to be within the disclosure of this application.

Example 1 is a method performed by a database system executing instructions on at least one hardware processor, the method including: sharing a provider-side database that resides in a data-provider account of a database system with a data-consumer account of the database system, the provider-side database including a provider-side database-level role; receiving a database-role-grant request to grant the provider-side database-level role to a consumer-side account-level role in the data-consumer account; and performing, responsive to receiving the database-role-grant request, a set of database-role-granting operations including: granting a hidden provider-side database-level role in the data-provider account to a hidden consumer-side database-level role in the data-consumer account, the hidden provider-side database-level role having been granted to the provider-side database-level role; and granting the hidden consumer-side database-level role to the consumer-side account-level role in the data-consumer account.

Example 2 is the method of Example 1, where the provider-side database-level role has one or more database-level-role privileges.

Example 3 is the method of Example 2, where: the provider-side database includes a table; and the one or more database-level-role privileges include access to the table.

Example 4 is the method of any of the Examples 1-3, where the set of database-role-granting operations further includes: creating the hidden provider-side database-level role in the data-provider account; granting the provider-side database-level role to the hidden provider-side database-level role; and creating the hidden consumer-side database-level role in the data-consumer account.

Example 5 is the method of Example 4, further including: receiving a database-mounting request from the data-consumer account; and establishing, in the data-consumer account in response to receiving the database-mounting request, a mounted database corresponding to the provider-side database, where the hidden consumer-side database-level role is created in the mounted database in the data-consumer account.

Example 6 is the method of Example 5, where the mounted database in the data-consumer account corresponding to the provider-side database includes the mounted database being a shadow database of references to table data stored in the provider-side database in the data-provider account.

Example 7 is the method of Example 5, further including: establishing, in the data-consumer account, a second mounted database corresponding to the provider-side database; receiving a second database-role-grant request to grant the provider-side database-level role to the consumer-side account-level role in the data-consumer account in connection with the second mounted database; performing, responsive to receiving the second database-role-grant request, a second set of database-role-granting operations including: creating, in the second mounted database, a second hidden consumer-side database-level role; granting the hidden provider-side database-level role to the second hidden consumer-side database-level role; and granting the second hidden consumer-side database-level role to the consumer-side account-level role in the data-consumer account in connection with the second mounted database.

Example 8 is the method of any of the Examples 1-7, where receiving the database-role-grant request includes receiving the database-role-grant request from the data-consumer account.

Example 9 is the method of any of the Examples 1-8, further including receiving a second database-role-grant request to grant the provider-side database-level role to a second consumer-side account-level role in the data-consumer account, and responsively granting the hidden consumer-side database-level role to the second consumer-side account-level role in the data-consumer account.

Example 10 is the method of any of the Examples 1-9, further including: receiving a database-role-revoke request to revoke the provider-side database-level role from the consumer-side account-level role; and revoking, responsive to receiving the database-role-revoke request, the hidden provider-side database-level role from the hidden consumer-side database-level role.

Example 11 is a database system including: at least one hardware processor; and one or more non-transitory computer readable storage media containing instructions that, when executed by the at least one hardware processor, cause the computer system to perform operations including: sharing a provider-side database that resides in a data-provider account of a database system with a data-consumer account of the database system, the provider-side database including a provider-side database-level role; receiving a databaserole-grant request to grant the provider-side database-level role to a consumer-side account-level role in the data-consumer account; and performing, responsive to receiving the database-role-grant request, a set of database-role-granting operations including: granting a hidden provider-side database-level role in the data-provider account to a hidden consumer-side database-level role in the data-consumer account, the hidden provider-side database-level role having been granted to the provider-side database-level role; and granting the hidden consumer-side database-level role to the consumer-side account-level role in the data-consumer account.

Example 12 is the database system of Example 11, where the provider-side database-level role has one or more database-level-role privileges.

Example 13 is the database system of Example 12, where: the provider-side database includes a table; and the one or more database-level-role privileges include access to the first table.

Example 14 is the database system of any of the Examples 11-13, where the set of database-role-granting operations further includes: creating the hidden provider-side database-level role in the data-provider account; granting the provider-side database-level role to the hidden provider-side database-level role; and creating the hidden consumer-side database-level role in the data-consumer account.

Example 15 is the database system of Example 14, the operations further including: receiving a database-mounting request from the data-consumer account; and establishing, in the data-consumer account in response to receiving the database-mounting request, a mounted database corresponding to the provider-side database, where the hidden consumer-side database-level role is created in the mounted database in the data-consumer account.

Example 16 is the database system of Example 15, where the mounted database in the data-consumer account corresponding to the provider-side database includes the mounted database being a shadow database of references to table data stored in the provider-side database in the data-provider account.

Example 17 is the database system of Example 15, the operations further including: establishing, in the data-consumer account, a second mounted database corresponding to the provider-side database; receiving a second database-role-grant request to grant the provider-side database-level role to the consumer-side account-level role in the data-consumer account in connection with the second mounted database; performing, responsive to receiving the second database-role-grant request, a second set of database-role-granting operations including: creating, in the second mounted database, a second hidden consumer-side database-level role; granting the hidden provider-side database-level role to the second hidden consumer-side database-level role; and granting the second hidden consumer-side account in connection with the second mounted database.

Example 18 is the database system of any of the Examples 11-17, where receiving the database-role-grant request includes receiving the database-role-grant request from the data-consumer account.

Example 19 is the database system of any of the Examples 11-18, the operations further including receiving a second database-role-grant request to grant the provider-side database-level role to a second consumer-side account-level role in the data-consumer account, and responsively granting the hidden consumer-side database-level role to the second consumer-side account-level role in the data-consumer account.

Example 20 is the database system of any of the Examples 11-19, the operations further including: receiving a database-role-revoke request to revoke the provider-side database-level role from the consumer-side account-level role; and revoking, responsive to receiving the database-role-revoke request, the hidden provider-side database-level role from the hidden consumer-side database-level role.

Example 21 is one or more non-transitory computer readable storage media containing instructions that, when executed by at least one hardware processor of a database system, cause the database system to perform operations including: sharing a provider-side database that resides in a data-provider account of a database system with a data-consumer account of the database system, the provider-side database including a provider-side database-level role; receiving a database-role-grant request to grant the provider-side database-level role to a consumer-side account-level role in the data-consumer account; and performing, responsive to receiving the database-role-grant request, a set of database-role-granting operations including: granting a hidden provider-side database-level role in the data-provider account to a hidden consumer-side database-level role in the data-consumer account, the hidden provider-side database-level role having been granted to the provider-side database-level role; and granting the hidden consumer-side account.

Example 22 is the one or more non-transitory computer readable storage media of Example 21, where the provider-side database-level role has one or more database-level-role privileges.

Example 23 is the one or more non-transitory computer readable storage media of Example 22, where: the provider-side database includes a table; and the one or more database-level-role privileges include access to the first table.

Example 24 is the one or more non-transitory computer readable storage media of any of the Examples 21-23, where the set of database-role-granting operations further includes: creating the hidden provider-side database-level role in the data-provider account; granting the provider-side database-level role to the hidden provider-side database-level role; and creating the hidden consumer-side database-level role in the data-consumer account.

Example 25 is the one or more non-transitory computer readable storage media of Example 24, the operations further including: receiving a database-mounting request from the data-consumer account; and establishing, in the data-consumer account in response to receiving the database-mounting request, a mounted database corresponding to the provider-side database, where the hidden consumer-side database-level role is created in the mounted database in the data-consumer account.

Example 26 is the one or more non-transitory computer readable storage media of Example 25, where the mounted database in the data-consumer account corresponding to the provider-side database includes the mounted database being a shadow database of references to table data stored in the provider-side database in the data-provider account.

Example 27 is the one or more non-transitory computer readable storage media of Example 25, the operations further including: establishing, in the data-consumer account, a second mounted database corresponding to the provider-side database; receiving a second database-role-grant request to grant the provider-side account in connection with the second mounted database; performing, responsive to receiving the second database-role-grant request, a second set of database-role-granting operations including: creating, in the second mounted database, a second hidden consumer-side database-level role; granting the hidden provider-side database-level role to the second hidden consumer-side database-level role; and granting the second hidden consumer-side database-level role to the consumer-side account-level role in the data-consumer account in connection with the second mounted database.

Example 28 is the one or more non-transitory computer readable storage media of any of the Examples 21-27, where receiving the database-role-grant request includes receiving the database-role-grant request from the data-consumer account.

Example 29 is the one or more non-transitory computer readable storage media of any of the Examples 21-28, the operations further including receiving a second database-role-grant request to grant the provider-side database-level role to a second consumer-side account-level role in the data-consumer account, and responsively granting the hidden consumer-side database-level role to the second consumer-side account-level role in the data-consumer account.

Example 30 is the one or more non-transitory computer readable storage media of any of the Examples 21-29, the operations further including: receiving a database-role-revoke request to revoke the provider-side database-level role from the consumer-side account-level role; and revoking, responsive to receiving the database-role-revoke request, the hidden provider-side database-level role from the hidden consumer-side database-level role.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network.

The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method performed by a database system executing instructions on at
least one hardware processor, the method comprising:
receiving a first database-mounting request from a data-consumer account;
establishing, in the data-consumer account in response to receiving the first database mounting request, a first mounted database that resides in the data-consumer account of the database system, the first mounted database being a shadow database comprising references to table data stored in a provider-side database in a data-provider account;
receiving a database-role-grant request to grant a provider-side database-level role to a consumer-side account-level role in the data-consumer account for the first mounted database, the provider-side database-level role having one or more database-level-role privileges, the database level-role privileges comprising at least one of: read access, write access, visibility access, usage access, or administrative access;
performing, responsive to receiving the database-role-grant request, a set of database-role granting operations comprising granting a first hidden provider-side database-level role to a hidden consumer-side account-level role in the data-consumer account for the first mounted database without granting the first hidden provider-side database-level role to the consumer-side account level role, the hidden consumer-side database-level role enabling the data-consumer account to perform one or more functions on a particular set of data with the role being hidden from the data consumer account, the hidden provider-side database-level role being hidden from the data-provider account;

receiving a second database-mounting request from the data-consumer account;

establishing, in the data-consumer account in response to receiving the second database mounting request, a second mounted database, the first and second mounted databases being shadow databases storing reference pointers to data stored in a provider-side database;

receiving a database-role-grant request to grant a provider-side database-level role to a consumer-side account-level role in the data-consumer account for the second mounted database;

granting a second hidden consumer-side database-level role to the consumer-side account level role in the data-consumer account for the second mounted database;

receiving a request to demount the first mounted database; and in response to receiving the request to demount the first mounted database, revoking a first hidden consumer-side database-level role without revoking the second hidden consumer-side database-level role leaving the second mounted database mounted on the data-consumer account.

2. The method of claim 1, wherein:

the provider-side database comprises a table; and the one or more database-level-role privileges comprise access to the table.

3. The method of claim 1, wherein the set of database-role-granting operations further comprises:

creating a hidden provider-side database-level role in a data-provider account;

granting the provider-side database-level role to the hidden provider-side database-level role; and creating the first hidden consumer-side database-level role in the data-consumer account.

4. The method of claim 3, further comprising:

receiving a database-mounting request from the data-consumer account; and establishing, in the data-consumer account in response to receiving the database-mounting request, a mounted database corresponding to the provider-side database, wherein the first hidden consumer-side database-level role is created in the mounted database in the data-consumer account.

5. The method of claim 4, wherein the mounted database in the data-consumer account corresponding to the provider-side database comprises the mounted database being a shadow database of references to table data stored in the provider-side database in the data-provider account.

6. The method of claim 4, further comprising:

establishing, in the data-consumer account, a second mounted database corresponding to the provider-side database;

receiving a second database-role-grant request to grant the provider-side database-level role to the consumer-side account-level role in the data-consumer account in connection with the second mounted database;

performing, responsive to receiving the second database-role-grant request, a second set of database-role-granting operations comprising:

creating, in the second mounted database, a second hidden consumer-side database-level role;

granting the hidden provider-side database-level role to the second hidden consumer-side database-level role; and granting the second hidden consumer-side database-level role to the consumer-side account-level role in the data-consumer account in connection with the second mounted database.

7. The method of claim 1, wherein receiving the database-role-grant request comprises receiving the database-role-grant request from the data-consumer account.

8. The method of claim 1, further comprising receiving a second database-role-grant request to grant the provider-side database-level role to a second consumer-side account-level role in the data-consumer account, and responsively granting the first hidden consumer-side database-level role to the second consumer-side account-level role in the data-consumer account.

9. The method of claim 3, further comprising:

receiving a database-role-revoke request to revoke the provider-side database-level role from the consumer-side account-level role; and revoking, responsive to receiving the database-role-revoke request, the hidden provider-side database-level role from the first hidden consumer-side database-level role.

10. The method of claim 1, wherein granting the first hidden provider-side database-level role to the hidden consumer-side account-level role in the data-consumer account for the first mounted database without granting the first hidden provider-side database-level role to the consumer-side account-level role comprises granting privileges of the first hidden provider-side database-level role to the hidden consumer-side account-level role while the consumer-side account-level role itself being hidden from the data-consumer account.

11. The method of claim 1, wherein granting the first hidden provider-side database-level role to the hidden consumer-side account-level role in the data-consumer account for the first mounted database without granting the first hidden provider-side database-level role to the consumer-side account-level role comprises granting privileges of the first hidden provider-side database-level role to the hidden consumer-side account-level role without granting at least some privileges of an unhidden provider-side database-level role to the consumer-side account-level role while the consumer-side account-level role itself being hidden from the data-consumer account.

12. The method of claim 1, wherein the hidden consumer-side database- level role enabling visibility of the particular set of data to the data-consumer account while the role being hidden from the data-consumer account.

13. A database system comprising:

at least one hardware processor; and one or more non-transitory computer readable storage media containing instructions that, when executed by the at least one hardware processor, cause the at least one hardware processor to perform operations comprising:

receiving a first database-mounting request from a data-consumer account;

establishing, in the data-consumer account in response to receiving the first database mounting request, a first mounted database that resides in the data-consumer account of the database system, the first mounted database being a shadow database comprising references to table data stored in a provider-side database in a data-provider account;

receiving a database-role-grant request to grant a provider-side database-level role to a consumer-side account-level role in the data-consumer account for the first mounted database, the provider-side database-level role having one or more database-level-role privileges, the database level-role privileges comprising at least one of: read access, write access, visibility access, usage access, or administrative access;

performing, responsive to receiving the database-role-grant request, a set of database-role granting operations comprising granting a first hidden provider-side database-level role to a hidden consumer-side account-level role in the data-consumer account for the first mounted database without granting the first hidden provider-side database-level role to the consumer-side account level role, the hidden consumer-side database-level role enabling the data-consumer account to perform one or more functions on a particular set of data with the role being hidden from the data consumer account, the hidden provider-side database-level role being hidden from the data-provider account;

receiving a second database-mounting request from the data-consumer account;

establishing, in the data-consumer account in response to receiving the second database mounting request, a second mounted database, the first and second mounted databases being shadow databases storing reference pointers to data stored in a provider-side database;

receiving a database-role-grant request to grant a provider-side database-level role to a consumer-side account-level role in the data-consumer account for the second mounted database;

granting a second hidden consumer-side database-level role to the consumer-side account level role in the data-consumer account for the second mounted database;

receiving a request to demount the first mounted database; and in response to receiving the request to demount the first mounted database, revoking a first hidden consumer-side database-level role without revoking the second hidden consumer-side database-level role leaving the second mounted database mounted on the data-consumer account.

14. The database system of claim 13, wherein:

the provider-side database comprises a table; and the one or more database-level-role privileges comprise access to the table.

15. The database system of claim 13, wherein the set of database-role- granting operations further comprises:

creating a hidden provider-side database-level role in a data-provider account;

granting the provider-side database-level role to the hidden provider-side database-level role; and creating the first hidden consumer-side database-level role in the data-consumer account.

16. The database system of claim 15, the operations further comprising:

receiving a database-mounting request from the data-consumer account; and establishing, in the data-consumer account in response to receiving the database-mounting request, a mounted database corresponding to the provider-side database, wherein the first hidden consumer-side database-level role is created in the mounted database in the data-consumer account.

17. The database system of claim 16, wherein the mounted database in the data-consumer account corresponding to the provider-side database comprises the mounted database being a shadow database of references to table data stored in the provider-side database in the data-provider account.

18. The database system of claim 16, the operations further comprising:

establishing, in the data-consumer account, a second mounted database corresponding to the provider-side database;

receiving a second database-role-grant request to grant the provider-side database-level role to the consumer-side account-level role in the data-consumer account in connection with the second mounted database;

performing, responsive to receiving the second database-role-grant request, a second set of database-role-granting operations comprising:

creating, in the second mounted database, a second hidden consumer-side database-level role;

granting the hidden provider-side database-level role to the second hidden consumer-side database-level role; and granting the second hidden consumer-side database-level role to the consumer-side account-level role in the data-consumer account in connection with the second mounted database.

19. The database system of claim 13, wherein receiving the database-role-grant request comprises receiving the database-role-grant request from the data-consumer account.

20. The database system of claim 13, the operations further comprising receiving a second database-role-grant request to grant the provider-side database-level role to a second consumer-side account-level role in the data-consumer account, and responsively granting the first hidden consumer-side database-level role to the second consumer-side account-level role in the data-consumer account.

21. The database system of claim 15, the operations further comprising:

receiving a database-role-revoke request to revoke the provider-side database-level role from the consumer-side account-level role; and revoking, responsive to receiving the database-role-revoke request, the hidden provider-side database-level role from the first hidden consumer-side database-level role.

22. One or more non-transitory computer readable storage media containing instructions that, when executed by at least one hardware processor of a database system, cause the database system to perform operations comprising:

receiving a first database-mounting request from a data-consumer account;

establishing, in the data-consumer account in response to receiving the first database mounting request, a first mounted database that resides in the data-consumer account of the database system, the first mounted database being a shadow database comprising references to table data stored in a provider-side database in a data-provider account;

receiving a database-role-grant request to grant a provider-side database-level role to a consumer-side account-level role in the data-consumer account for the first mounted database, the provider-side database-level role having one or more database-level-role privileges, the database level-role privileges comprising at least one of: read access, write access, visibility access, usage access, or administrative access;

performing, responsive to receiving the database-role-grant request, a set of database-role granting operations comprising granting a first hidden provider-side database-level role to a hidden consumer-side account-level role in the data-consumer account for the first mounted database without granting the first hidden provider-side database-level role to the consumer-side account level role, the hidden consumer-side database-level role enabling the data-consumer account to perform one or more functions on a particular set of data with the role being hidden from the data consumer account, the hidden provider-side database-level role being hidden from a data-provider account;

receiving a second database-mounting request from the data-consumer account;

establishing, in the data-consumer account in response to receiving the second database mounting request, a second mounted database, the first and second mounted databases being shadow databases storing reference pointers to data stored in a provider-side database;

receiving a database-role-grant request to grant a provider-side database-level role to a consumer-side account-level role in the data-consumer account for the second mounted database;

granting a second hidden consumer-side database-level role to the consumer-side account level role in the data-consumer account for the second mounted database;

receiving a request to demount the first mounted database; and in response to receiving the request to demount the first mounted database, revoking a first hidden consumer-side database-level role without revoking the second hidden consumer-side database-level role leaving the second mounted database mounted on the data-consumer account.

23. The one or more non-transitory computer readable storage media of claim 22, wherein:

the provider-side database comprises a table; and the one or more database-level-role privileges comprise access to the table.

24. The one or more non-transitory computer readable storage media of claim 22, wherein the set of database-role-granting operations further comprises:

creating a hidden provider-side database-level role in a data-provider account;

granting the provider-side database-level role to the hidden provider-side database-level role; and creating the first hidden consumer-side database-level role in the data-consumer account.

25. The one or more non-transitory computer readable storage media of claim 24, the operations further comprising:

receiving a database-mounting request from the data-consumer account; and establishing, in the data-consumer account in response to receiving the database-mounting request, a mounted database corresponding to the provider-side database, wherein the first hidden consumer-side database-level role is created in the mounted database in the data-consumer account.

* * * * *